United States Patent
Colovas et al.

[11] 3,712,238
[45] Jan. 23, 1973

[54] VEHICLE SWITCHING DEVICE

[75] Inventors: Denny D. Colovas; John S. Logan; Richard R. Skruch, all of Dearborn, Mich.

[73] Assignee: Ford Motor Company, Dearborn, Mich.

[22] Filed: Oct. 4, 1971

[21] Appl. No.: 186,211

[52] U.S. Cl. ................................................ 104/130
[51] Int. Cl. .................................................. E01c 9/02
[58] Field of Search ....................... 104/96, 105, 130

[56] References Cited

UNITED STATES PATENTS

| | | | |
|---|---|---|---|
| 3,621,790 | 11/1971 | Broome | 104/130 |
| 3,593,665 | 7/1971 | Marty | 104/130 |
| 3,643,600 | 2/1972 | Bertin | 104/130 |
| 3,098,454 | 7/1963 | Mabstrelli | 104/130 |

*Primary Examiner*—Gerald M. Forlenza
*Assistant Examiner*—D. W. Keen
*Attorney*—Keith L. Zerschling et al.

[57] ABSTRACT

A vehicle switching device for a guided transportation system is disclosed. The device includes an axle with its central portion secured to a vehicle support structure. First and second structures deployably mount right and left vehicle switching devices on the axle. A first deployment structure is connected between the right and the left vehicle switching devices for spacing the two devices either in a first condition, a second condition or a third condition with respect to one another. A second deployment structure is connected between the first deployment structure and the axle for changing the position of the first deployment structure with respect to the axle. The operation of the deployment structures is effective to deploy the right, or the left, or neither of the vehicle switching devices.

10 Claims, 3 Drawing Figures

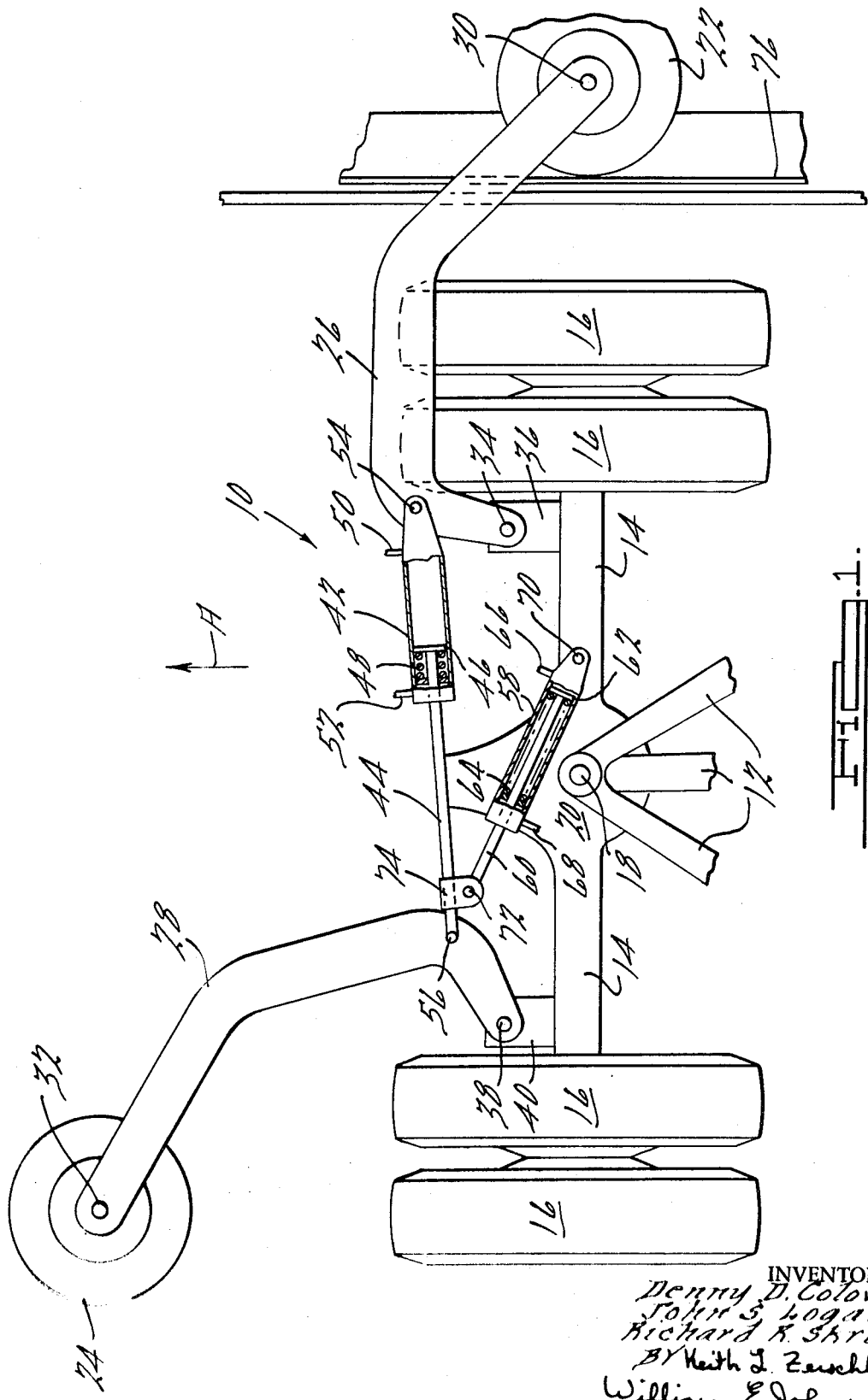

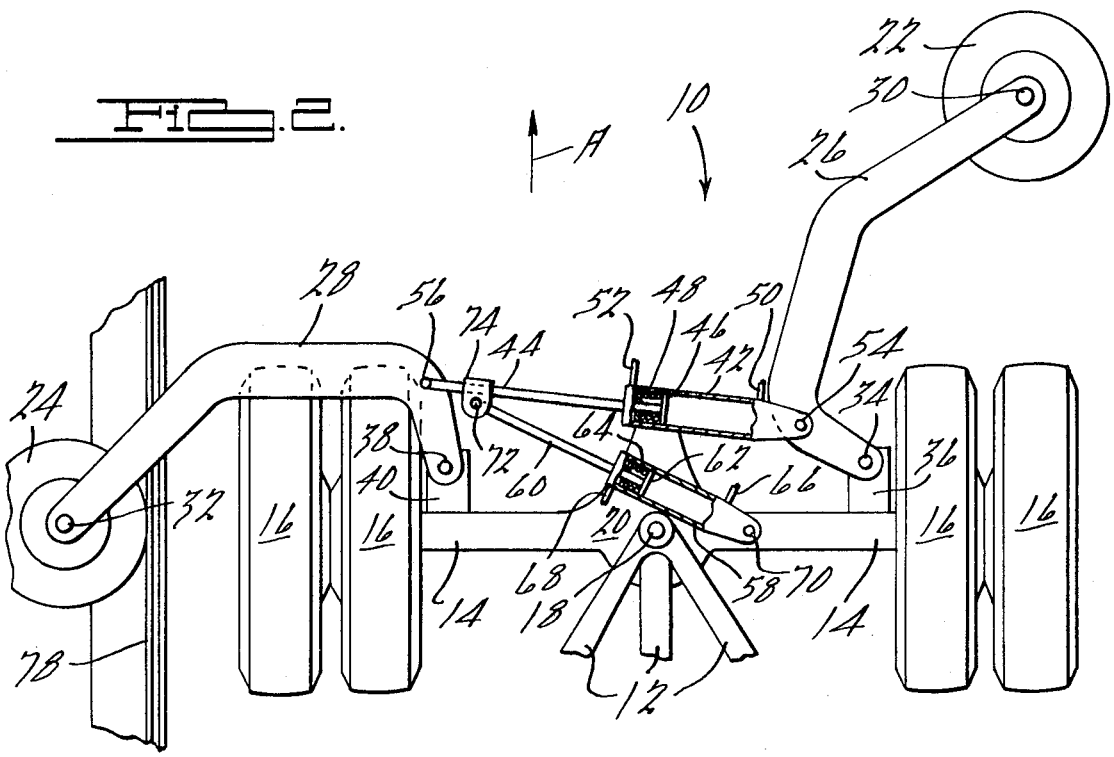
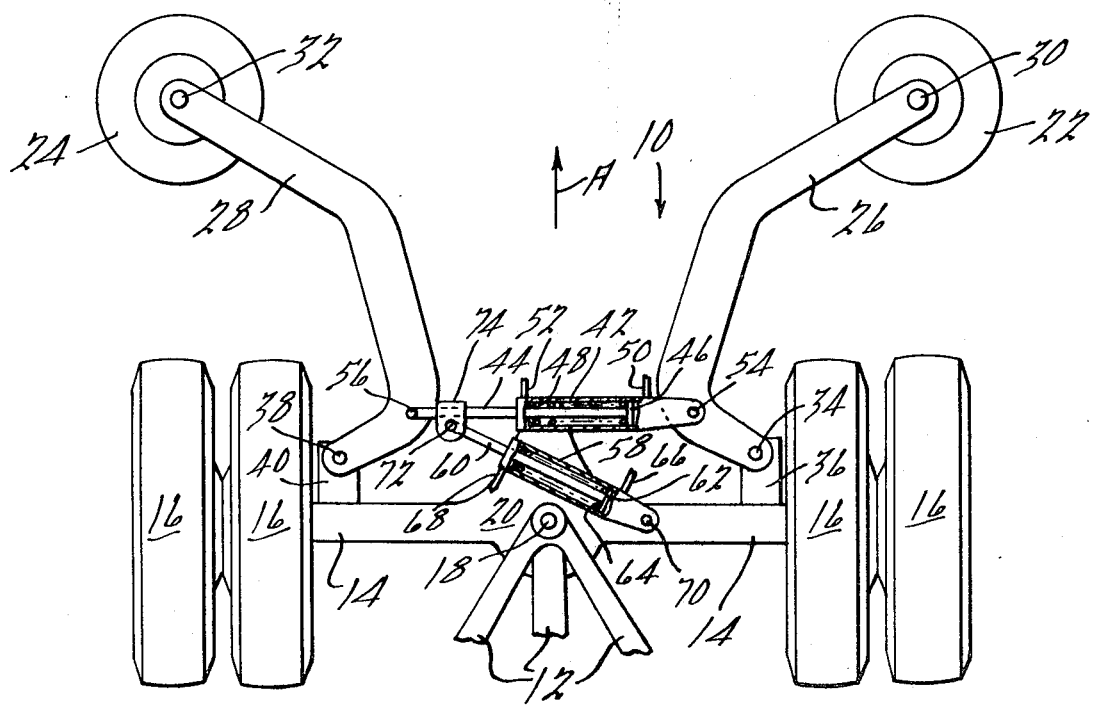

VEHICLE SWITCHING DEVICE

BACKGROUND OF THE INVENTION

The prior art has taught many different transportation vehicles which may be guided along predetermined paths. Examples of such vehicles are railroad and subway vehicles which are guided along rails to move the vehicle along a predetermined path. The railroad or subway vehicle is moved from one path of travel to another path of travel by intricate switching mechanisms. Generally these switching mechanisms require the shifting of track elements in order to direct the vehicle onto a different path of travel.

Switching systems are also known for pneumatic tired vehicles. These systems generally function in a manner similar to the switching systems for track type vehicles. For example, U.S. Pat. No. 3,098,454, issued July 23, 1963 teaches a switching structure wherein movable guide elements associated with the roadbed are employed to switch the pneumatic tired vehicle from one path to another path. Once again, the disadvantage of this type of transportation system is that the guide elements must be switched to switch a vehicle. The apparatus for switching such guide elements is expensive and complex.

It is a general purpose of the transportation vehicle switching device of this invention to eliminate some of the difficulties found in prior art switching devices. More particularly, the vehicle switching device of this invention is a so called "onboard" switching device in which the active switching elements are carried on portions of the vehicle rather than by the track or roadbed over which the vehicle passes. It is a principle purpose of this invention to provide a switching device of simple construction which is effective in operation to switch the vehicle either to the right or to the left in a vehicle switch of the transportation system.

SUMMARY OF THE INVENTION

This invention is directed to a vehicle switching device and, more particularly, to a vehicle switching device for a guided transportation system in which the transportation vehicle is supported by a plurality of wheels.

In accordance with the teachings of this invention, a vehicle switching device for a guided transportation system includes the following general elements. An axle supporting wheels at opposite ends thereof is pivotably connected at the axle's central portion to a vehicle support structure. A right and a left vehicle switching device is provided for switching the vehicle to the right or to the left when a respective one of the switching devices is deployed. First and second structures are provided for deployably mounting the switching devices on the axle. A first deployment structure is connected between the right and the left vehicle switching devices for spacing the two devices either in a first condition, a second condition or a third condition with respect to one another. A second deployment structure is connected between the first deployment structure and the axle for changing the position of the first deployment structure with respect to the axle from a first position to a second position. When the first deployment structure spaces the two switching devices in their first condition with respect to one another, neither of the switching devices are deployed. One of the switching devices is deployed when the switching devices are in their second condition with respect to one another and the first deployment structure is in its first position with respect to the axle. The other one of the switching devices id deployed when the switching devices are in their third condition with respect to one another which is caused by moving the first deployment structure to its second position with respect to the axle while said switching devices are initially in their second condition with respect to one another.

BRIEF DESCRIPTION OF THE DRAWINGS

FIG. 1 is a plan view of a vehicle switching device for a guided transportation system in accordance with the teachings of this invention. The switching device is shown as utilized by a single axle of the vehicle. FIG. 1 shows the right switching device in a deployed position.

FIG. 2 is a plan view of the same structure shown in FIG. 1 with the exception that the left switching device is in a deployed position.

FIG. 3 is a plan view of the structure of FIG. 1 except that both of the switching devices are in an undeployed position.

DESCRIPTION OF THE PREFERRED EMBODIMENT

CONSTRUCTION

The drawings set forth a vehicle switching device for a guided transportation system in accordance with the general teachings of this invention. The drawings illustrate the vehicle switching device in its three primary modes of operation. The primary modes of operation are: (a) switching the vehicle to the right, (b) switching the vehicle to the left, and (c) no vehicle switching. A general understanding of the subject matter of this invention may be had by referring to the drawings in which like parts are designated by like numerals in the several figures. While the drawings show only a single vehicle axle, it is understood that the switching structure of this invention can be used with all the vehicle's axles.

Reference is now made to the drawings in which the numeral 10 generally designates the vehicle switching device of this invention. The device includes vehicle support structure 12 which serves as the undercarriage for a vehicle body (not shown). An axle 14, having a plurality of pneumatic tires 16 associated therewith at opposite ends thereof, is pivotably secured by a pivot pin 18 from a central portion 20 of the axle to the support structure 12. This pivotable connection, of course, allows the axle to rotate with respect to the vehicle body in accordance with normal practice.

As viewed in the drawings, the vehicle travels along a path of movement in the direction of arrow A. A right vehicle switch wheel 22 and a left vehicle switch wheel 24 are secured respectively to a first switch arm 26 and a second switch arm 28 by rotatable shafts 30 and 32. First pivotably support structure 34 secures one end of the first switch arm 26 to an extension 36 of the axle 14. A second pivotable structure 38 secures the second switch arm 28 to an extension 40 of the axle 14. In this manner, the two switch arms are pivotable about their pivot structures between undeployed and deployed positions.

A first deployment structure in the form of a first hydraulic cylinder 42 is connected between the first and the second switch arms 26 and 28. In particular, as best illustrated in FIG. 1, the first hydraulic cylinder 42 includes a piston rod 44, a piston head 46, a coil spring 48, a first hydraulic pipe 50 and a second hydraulic pipe 52. As seen in FIG. 1, a pivot pin 54 connects one end of the first hydraulic cylinder to the first switch arm while a second pivot pin 56 connects the end of the piston rod 44 to the second switch arm. The first hydraulic cylinder is in a passive stage when the coil spring 48 returns the piston head 46 to its normal stage and is in an active stage when fluid under pressure is admitted to the cylinder through the first pipe 50 to move the piston head to the position illustrated in FIG. 1.

A second deployment device in the form of a second hydraulic cylinder 58 is also best seen in FIG. 1. The second hydraulic cylinder includes a piston rod 60, a piston head 62, a coil spring 64, a first hydraulic pipe 66, and a second hydraulic pipe 68 for supplying and removing the cylinder's hydraulic fluid. A first pivot pin 70 connects one end of the second cylinder 58 to the axle 14. A second pivot pin 72 pivotably connects the exposed end of the piston rod 60 to a bracket 74 which is, in turn, secured to the exposed end of the piston rod 44 of the first cylinder 42. As shown in FIG. 1, the second hydraulic cylinder 58 is in its normal condition wherein the coil spring 64 has returned the piston head 62 to its normal position.

OPERATION

The operation of the vehicle switching device 10 of this invention will now be described. Reference is made to FIG. 3 which shows the right and left switch wheels 22 and 24 in a retracted position. In the retracted position, the first switch arm 26 and the second switch arm 28 are spaced a minimum distance from one another because the first hydraulic cylinder 42 connected therebetween is in its passive stage. In greater detail, the first hydraulic cylinder does not have a positive pressure applied to the first pipe 50 thereof whereby the piston head 46 of the piston rod 44 is in the position shown in FIG. 3. The piston rod is in this position because of the action of the coil spring 48 returning the piston rod to its normal condition. Also, the coil spring 64 is acting on the piston rod 60 of the second hydraulic cylinder 58 in a manner that it is in its normal condition which locates the first hydraulic cylinder 42 in a first position with respect to the axle 14.

Reference is now made to FIG. 1 in which the right vehicle switch wheel 22 is in a deployed position. In this position the wheel is in engagement with a guide track 76 for the purpose of guiding the vehicle through a switch to the right. The right switch wheel is moved to its deployed position by pivoting the first switch arm 26 about its first pivotable structure 34 whereby a maximum spacing is established between it and the second switch arm 28. This pivoting action is achieved by applying a positive pressure to the first pipe 50 of the hydraulic cylinder 42. In this manner, the piston rod 44 is moved against the bias of the coil spring 48 to a point where the first hydraulic cylinder is in an active stage. The second hydraulic cylinder 58 is in its passive stage as illustrated in FIG. 1 during a vehicle switching operation to the right.

Reference is now made to FIG. 2 which shows the vehicle switching device 10 of this invention in a left vehicle switching condition. In this condition, the left vehicle switch wheel 24 is in engagement with a left guide track 78 for the purpose of guiding the vehicle to the left while passing through the switch. The achievement of this switching condition is brought about by again establishing a maximum spacing between the first switch arm 26 and the second switch arm 28 by maintaining the first hydraulic cylinder 42 in its active stage. In this third condition, however, the two switch arms are in a mirror image condition from the switch to the right. The difference between the right switching mode and the left switching mode of the vehicle is accomplished by moving the second hydraulic cylinder 58 to its active stage wherein the piston rod 60 thereof acts to compress the coil spring 64 to such a condition that the second hydraulic cylinder is in its active stage. The movement of the second hydraulic cylinder to its active stage causes the location of the second pivot pin 56 which secures the piston rod 44 to the second switch arm 28 to be moved to a second location with respect to the axle 14. The movement of the second hydraulic cylinder to its active stage is also effective in causing a shifting of the conditions of the two switch arms with respect to one another as described above. However, at the end of the shifting movement, the two switch arms have the maximum spacing therebetween. The changing of the position of the end of the piston 44 is effective to deploy the left switch wheel 24 and retract the right switch wheel 22 as illustrated in the drawing because of the shift in the two wheels' positions. The second hydraulic cylinder 58 is moved to its active condition by supplying hydraulic fluid under pressure from a suitable control device (not illustrated) to the first pipe 66 thereof and by exhausting hydraulic fluid from the second pipe 68 thereof. The switch wheels are retracted to the position of FIG. 3 by removing the positive pressure from the first pipe of each of the cylinders. Since a maximum spacing is already achieved between the switch arms when switching to the right or to the left, both arms can never be deployed at the same time.

There has been disclosed herein a vehicle switching device for a guided transportation system which is economical to construct and efficient in operation. The vehicle switching device is so constructed that it automatically returns to a non-vehicle switching condition if the hydraulic systems of the vehicle fails. Many modifications of this switching device will be apparent to those skilled in the art in view of the presentation of this specification. It is intended that all modifications which fall within the true spirit and scope of the invention be included within the terms of the appended claims.

We claim:
1. A vehicle switching device for a guided transportation system, which switching device comprises;
    a vehicle support structure;
    an axle supporting wheels at opposite ends thereof pivotably connected at a central portion thereof to said vehicle support structure;
    right vehicle switching means for switching the vehicle to the right when said switching means is deployed;
    left vehicle switching means for switching the vehicle to the left when said switching means is deployed;

first structure means for deployably mounting said right vehicle switching means on said axle;

second structure means for deployably mounting said left vehicle switching means on said axle;

first deployment means connected between said right and said left vehicle switching means for spacing portions of said two switching means either a first distance or a second distance with respect to one another;

second deployment means connected between said first deployment means and said axle for changing the position of said first deployment means with respect to said axle from a first position to a second position, whereby (a) neither of said switching means are deployed when said switching means are spaced said first distance with respect to one another, (b) only one of said switching means is deployed when said switching means are spaced said second distance with respect to one another and said first deployment means with respect to one another and said first deployment means is in said first position with respect to said axle, and (c) only the other one of said switching means id deployed when said switching means are spaced said second distance with respect to one another and said first deployment means is in said second position with respect to said axle.

2. The vehicle switching device of claim 1 wherein: said first and said second deployment means are hydraulically operated piston-cylinder assemblies; wherein said two switching means are spaced said first distance when said piston of said first piston-cylinder assembly is fully retracted and are spaced said second distance when said piston of said first piston-cylinder assembly is fully extended; and wherein said first deployment means is in its said first position when said piston of said second piston-cylinder assembly is fully retracted and in its second position when said piston of said second piston-cylinder assembly is fully extended.

3. The vehicle switching device of claim 2 wherein: said piston-cylinder assemblies forming said first and said second deployment means includes spring members therein that act on said pistons so as to bias them to a normal condition wherein said switching means are in said first spacing and said first deployment means is in its said first position.

4. A vehicle switching device for a guided transportation system, which switching device comprises:

a vehicle support structure;

an axle having a central portion pivotably connected to said vehicle supporting structure, said axle having wheels rotatably secured to opposite ends thereof;

first and second switch engaging means each having a free end for directing the vehicle through a switch in the transportation system;

first and second structure means for individually, pivotably mounting said first and second switch engaging means on said axle at positions on opposite sides of said axle's pivotable connection to said support structure, each of said switch engaging means thereby having its said free end pivotable from a remote position to a deployed position wherein it can accomplish a switching function;

first deployment means having an active stage and a passive stage, said first deployment means having two ends respectively secured to a portion of said first and said second switch engaging means, said first deployment means for positioning said switch engaging means in a first spacing with respect to one another when in its said passive stage and for positioning said switch engaging means in a second spacing with respect to one another when in its said active stage; and second deployment means having an active stage and a passive stage, said second deployment means having two ends, one of said ends being secured to one end of said first deployment means and said other end being secured to said axle, said second deployment means for spacing said one end of said first deployment means in a first position with respect to said axle when said second deployment means is in its passive stage and for spacing said one end of said first deployment means in a second position with respect to said axle when said second deployment means is in its active stage;

whereby (a) neither of said switch engaging means are deployed when both said deployment means are in their passive stages, (b) one of said switch engaging means is deployed when only said first deployment means is in an active stage, and (c) the other of said switch engaging means is deployed when both of said deployment means are in active stages.

5. The vehicle switching device of claim 4 wherein: said first and said second deployment means are hydraulically operated piston-cylinder assemblies and wherein said passive stage of said assemblies are when said pistons thereof are fully retracted and said active stages are when said pistons are fully advanced.

6. The vehicle switching device of claim 5 wherein: said piston-cylinder assemblies forming said first and second deployment means include spring members therein which act on said pistons so as to bias them normally towards said passive stages thereof.

7. A vehicle switching device for a guided transportation system, which switching device comprises:

a vehicle support structure;

axle means for rotatably supporting wheels on opposite ends thereof;

wheel means for forming said wheels supported by said axle means;

mounting means for pivotably securing a central portion of said axle means to said vehicle support structure;

a pair of switch wheels;

a first switch arm and a second switch arm;

first switch wheel and second switch wheel securing means respectively for rotatably securing said first switch wheel to a first end of said first switch arm and for rotatably securing said second switch wheel to a first end of said second switch arm;

first pivotable support structure means for securing a second end of said first switch arm to said axle means between said central portion of said axle means and one of said wheel supporting ends of said axle means;

second pivotable support structure means for securing a second end of said second switch arm to said axle means between said central portion of said axle means and the other end of said wheel supporting end of said axle means;

first deployment means having an active stage and a passive stage, said first deployment means having one end secured to a portion of said first switch arm and another end secured to a portion of said second switch arm, said first deployment means for spacing said switch arms a minimum distance from one another when in said passive stage and for spacing said arms a maximum distance from one another when in said active stage;

second deployment means having an active stage and a passive stage, said second deployment means having one end secured to said first deployment means near said one end of said first deployment means and the other end secured to said axle means, said second deployment means for spacing said one end of said first deployment means secured to said first switching arm in a first position with respect to said axle means when in its passive stage and for spacing said one end in a second position with respect to said axle means when in its active stage; and control means for moving individually said first and said second deployment means between their said active and passive stages in a manner so that neither of said switch wheels are deployed when both of said deployment means are in their said passive stages, said first switch arm and switching wheel associated therewith are deployed when both said deployment means are in their said active stages, and said second switch arm and switch wheel associated therewith are deployed when only said first deployment means is in its active stage.

8. The vehicle switching device of claim 7 wherein: said first and said second deployment means are hydraulically operated piston-cylinder assemblies, and wherein said passive stage of said assemblies are when said pistons thereof are fully retracted and said active stages are when said pistons are fully advanced.

9. The vehicle switching device of claim 8 wherein: said piston-cylinder assemblies forming said first and said second deployment means include spring members therein which act on said pistons so as to bias them normally towards said passive stages thereof.

10. The vehicle switching device of claim 7 wherein: said other end of said second deployment means secured to said axle means is secured to said axle means at a position on the same side of said axle means as said second pivotable support structure means secures said second end of said second switch arm to said axle means.

* * * * *